(12) United States Patent
Zorzi et al.

(10) Patent No.: US 10,829,946 B2
(45) Date of Patent: Nov. 10, 2020

(54) MOBILE OPERATING MACHINE FOR DELIVERING CONCRETE

(71) Applicant: CIFA S.P.A., Senago (IT)

(72) Inventors: Emanuele Zorzi, Cesano Maderno (IT); Massimo Calculli, Novate Milanese (IT); Davide Tarsitano, Caronno Pertusella (IT); Maria Laura Bacci, Romano di Lombardia (IT)

(73) Assignee: CIFA S.P.A. (IT)

( * ) Notice: Subject to any disclaimer, the term of this patent is extended or adjusted under 35 U.S.C. 154(b) by 0 days.

(21) Appl. No.: 16/458,508

(22) Filed: Jul. 1, 2019

(65) Prior Publication Data

US 2020/0002961 A1  Jan. 2, 2020

(30) Foreign Application Priority Data

Jul. 2, 2018  (IT) .................. 102018000006838

(51) Int. Cl.
| | |
|---|---|
| *E04G 21/04* | (2006.01) |
| *B28C 5/42* | (2006.01) |
| *B60K 25/00* | (2006.01) |
| *B60P 3/16* | (2006.01) |

(52) U.S. Cl.
CPC ........ *E04G 21/0436* (2013.01); *B28C 5/4213* (2013.01); *B28C 5/4272* (2013.01); *B60K 25/00* (2013.01); *B60P 3/16* (2013.01); *E04G 21/0445* (2013.01)

(58) Field of Classification Search
CPC ... E04G 21/0436; E04G 21/0445; B60P 3/16; B60K 25/00; B28C 5/4272; B28C 5/085; B28C 5/4213
See application file for complete search history.

(56) References Cited

U.S. PATENT DOCUMENTS

| 8,616,758 | B2 * | 12/2013 | Takahashi | B28C 5/4213 |
| | | | | 366/61 |
| 9,346,186 | B2 * | 5/2016 | Takahashi | B28C 5/4213 |
| 9,481,106 | B2 * | 11/2016 | Takahashi | B28C 5/4213 |
| 9,551,385 | B2 * | 1/2017 | Takahashi | B28C 5/4213 |
| 9,694,683 | B2 * | 7/2017 | Takahashi | B28C 5/4213 |
| 9,726,276 | B2 * | 8/2017 | Takahashi | F16H 61/4139 |
| 10,625,990 | B2 * | 4/2020 | Henikl | E04G 21/0463 |
| 2013/0111892 | A1 * | 5/2013 | Takahashi | B28C 5/4213 |
| | | | | 60/459 |

(Continued)

FOREIGN PATENT DOCUMENTS

JP  2003301802 A * 10/2003 ............. B28C 5/422

*Primary Examiner* — Charles Cooley
(74) *Attorney, Agent, or Firm* — BakerHostetler

(57) ABSTRACT

A mobile operating machine comprising a motor vehicle provided with at least one internal combustion motor which cooperates with a movement unit to move said motor vehicle, an articulated arm able to deliver concrete and a pumping unit configured to pump the concrete from said drum to said articulated arm. At least one of either the articulated arm or the pumping unit is connected to a respective hydraulic pump configured to pump a working fluid and determine the drive of said articulated arm and/or respectively said pumping unit. The mobile operating machine also comprises at least one electromechanical machine connected to said internal combustion motor, to said hydraulic pump, and to an electric accumulator.

10 Claims, 7 Drawing Sheets

(56) References Cited

U.S. PATENT DOCUMENTS

| | | | | |
|---|---|---|---|---|
| 2013/0276577 A1* | 10/2013 | Kroschel | ............... | B28C 5/4213 74/665 B |
| 2014/0015315 A1* | 1/2014 | Takahashi | ............. | B28C 5/4213 307/10.1 |
| 2015/0306786 A1* | 10/2015 | Pirri | ........................ | B28C 5/421 366/60 |
| 2016/0199999 A1* | 7/2016 | Pirri | ........................ | B28C 5/421 366/60 |
| 2016/0250774 A1* | 9/2016 | Takahashi | ............... | F02D 29/04 366/61 |
| 2017/0080600 A1* | 3/2017 | Dickerman | ............. | B28C 5/422 |
| 2020/0124062 A1* | 4/2020 | Yuan | ........................ | F15B 13/01 |

* cited by examiner

MOBILE OPERATING MACHINE FOR DELIVERING CONCRETE

CROSS REFERENCE TO RELATED APPLICATIONS

This application claims priority under 35 U.S.C. § 119 from Italian Patent Application No. 102018000006838, filed Jul. 2, 2018 with the Italian Patents and Trademarks Office, Italy, the contents of which are incorporated herein by reference.

TECHNICAL FIELD

The present invention concerns a mobile operating machine, such as a concrete mixer pump truck, a truck-mounted pump or suchlike. The present invention also concerns a functioning method of the mobile operating machine.

BACKGROUND

The use of mobile operating machines, such as concrete mixer pump trucks, truck-mounted pumps, or suchlike, generally consisting of a motor vehicle on which one or more apparatuses or work units are positioned, is known.

Concrete mixer pump trucks, for example, are used to transport, mix and distribute concrete from a production plant to the location of the construction site where the concrete is used. These concrete mixer pump trucks are provided with at least a rotatable drum to mix the concrete, at least an articulated arm to distribute or deliver the concrete and at least a unit to pump the concrete from the drum to the articulated arm.

Truck-mounted pumps receive the concrete to be pumped or delivered from one or more external concrete mixer pump trucks, and a pumping unit of the truck-mounted pump pumps the concrete toward the articulated arm.

The articulated arm is provided with a pipe that extends for the entire length of the articulated arm and the concrete is pumped through this pipe toward the terminal end of the articulated arm itself.

If the mobile operating machine is a concrete mixer pump truck, both during the loading step in the production plant, and also during the transport step to the construction site, the concrete must be kept malleable, and therefore the rotatable drum, which contains the concrete, must be kept in constant rotation in order to prevent it from drying and hardening.

Furthermore, on arrival at the construction site, the concrete mixer pump truck sometimes has to wait its turn for the unloading step. Also in this step the drum must be kept in constant rotation.

Before the step of pumping the concrete through the articulated arm and therefore before the final distribution step, the concrete undergoes a homogenization step, in which the drum of the concrete mixer pump truck is made to rotate at the maximum rotation speed.

During the step of the concrete passing toward the pumping unit and therefore toward the articulated arm, the rotatable drum is rotated in the direction opposite the mixing direction.

In known concrete mixer pump trucks, the rotation of the drum normally happens by means of a hydraulic motor driven by a group of pumps commanded by an internal combustion motor which is usually a diesel engine. The internal combustion motor can be the one that moves the motor vehicle or an auxiliary motor independent of that of the vehicle that it is mounted on it.

The drive of the unit pumping the concrete from the drum to the articulated arm is also normally commanded by this internal combustion motor, both in concrete mixer pump trucks and also in truck-mounted pumps. In the case of concrete mixer pump trucks, as mentioned, the rotatable drum is mounted directly on the mobile operating machine, while in the case of truck-mounted pumps, the rotatable drum is mounted on a separate motor vehicle, for example a concrete mixer truck which is located alongside the truck-mounted pump to discharge the concrete.

Furthermore, the articulated arm, both in concrete mixer pump trucks and also in truck-mounted pumps, is normally provided with a plurality of reciprocally articulated sections, or segments, and is provided with a series of hydraulic actuators or motors that allow the rotation of one section with respect to the other. These hydraulic motors are fed by pumping devices which are also commanded by the internal combustion motor.

One disadvantage of known mobile operating machines is that, in order to command the pumping devices associated with the articulated arm and to command the unit for pumping the concrete from the drum to the articulated arm, their internal combustion motor must always be switched on. The ignition of the internal combustion motor, during the step of loading and the step of unloading the concrete, entails the emission of exhaust gases that are harmful both to health and also to the environment. Furthermore, known mobile operating machines are often quite noisy, therefore also presenting problems of excessive noise emissions.

EP 3.023.212 describes a machine to spray concrete in which at least part of the components has an electric drive.

Other limitations and disadvantages of conventional solutions and technologies will be clear to a person of skills in the art after reading the remaining part of the present description with reference to the drawings and the description of the embodiments that follow, although it is clear that the description of the state of the art connected to the present description must not be considered an admission that what is described here is already known from the state of the prior art.

There is therefore the need to perfect a mobile operating machine which can overcome at least one of the disadvantages of the state of the art.

One purpose of the present invention is to provide a substantially hybrid mobile operating machine which is efficient and versatile for the different modes of use for which the machine is intended.

In particular, it is also a purpose of the present invention to allow the drive of at least some of the operating components of the operating machine without the aid of the internal combustion motor of the mobile operating machine.

Therefore, advantageously, one purpose of the present invention is also to produce a mobile operating machine in which at least one of either the articulated arm, the unit pumping the concrete from the drum to the articulated arm, or the drum itself can be driven even when the internal combustion motor is switched off, for example when the motor vehicle is stationary.

Another purpose of the present invention is to provide a mobile operating machine which allows to reduce the consumption of fuel, for example diesel fuel, and to reduce the corresponding emissions, for example of carbon dioxide and particulate, thus avoiding problems of cost and environmental pollution.

Another purpose is to achieve noise reduction and health protection for those people who are near the mobile operating machine, including the workers on the construction site affected by its presence.

The Applicant has devised, tested and embodied the present invention to overcome the shortcomings of the state of the art and to obtain these and other purposes and advantages.

SUMMARY

The present invention is set forth and characterized in the independent claims, while the dependent claims describe other characteristics of the invention or variants to the main inventive idea.

In accordance with the above purposes, a mobile operating machine, according to the present invention, comprises a motor vehicle provided with at least one internal combustion motor which cooperates with a movement unit to move the motor vehicle, at least one articulated arm able to deliver concrete and at least one pumping unit configured to pump the concrete to the articulated arm.

According to one aspect of the present invention, at least one of either the articulated arm or the pumping unit is connected to a respective hydraulic pump configured to pump a working fluid and determine the drive of the articulated arm and/or respectively of the pumping unit.

The concrete mixer pump truck, according to the present invention, also comprises at least an electromechanical machine connected to an electric accumulator, to the hydraulic pump and to the internal combustion motor.

The electromechanical machine is configured to assume at least a first operating condition in which it converts the mechanical energy of the internal combustion motor into electric energy to be accumulated in the electric accumulator, and a second operating condition in which it converts the electric energy of the electric accumulator into mechanical energy to drive the hydraulic pump.

The electromechanical machine therefore functions as an alternator, that is, as an electric power generator, in its first operating condition, while it functions as an electric motor in its second operating condition.

Advantageously, the present mobile operating machine is substantially hybrid and provides at least a first operating mode in which the at least one pumping device to drive one of either the drum, the articulated arm or the pumping unit is driven by the internal combustion motor and at least a second operating mode in which the at least one pumping device is electrically driven with the electromechanical machine.

The solution according to the present invention also allows to hydraulically drive at least one of either the articulated arm or the pumping unit, providing in any case an electric drive of the hydraulic command part.

Therefore, advantageously, in the present mobile operating machine, at least one of either the articulated arm or the concrete pumping unit can be driven even when the internal combustion motor is switched off, for example when the motor vehicle is stationary, by starting the electromechanical machine.

Advantageously by means of the present mobile operating machine, it is possible to reach operating efficiencies that are clearly higher than those obtainable with known mobile operating machines, since the machine avoids using only oil-dynamic pumps and motors, the functioning of which is characterized by lower performances, and instead a substantially hybrid functioning is used.

If the mobile operating machine is a concrete mixer pump truck, it can comprise a rotatable drum to mix the concrete and at least one of either the drum, the articulated arm or the pumping unit is connected to a corresponding hydraulic pump, configured to pump a working fluid and determine the drive respectively of the drum, of the articulated arm and/or of the pumping unit.

At least a disengagement device can be positioned between the internal combustion motor and the electromechanical machine, able to allow the selective disconnection of the internal combustion motor from the electromechanical machine at least when the electromechanical machine is in its first operating condition.

The disengagement device can comprise an idle wheel or an overrunning joint, that is, a device configured to allow the transmission of power from the internal combustion motor toward the electromechanical machine and to prevent the transmission of power from the electromechanical machine to the internal combustion motor.

In some embodiments, at least one of either the articulated arm, the pumping unit or the possible drum, can be driven by at least one other electric motor, distinct from the electromechanical machine, and connected to the electric accumulator.

In further embodiments, the mobile operating machine can comprise a plurality of hydraulic pumps selectively connected to the electromechanical machine by means of a mechanical coupler.

According to possible solutions, the mechanical coupler comprises a drive shaft connected to the electromechanical machine and the hydraulic pumps are all connected to the mechanical coupler.

According to some embodiments of the invention, the disengagement device can also be connected on the drive shaft, in an intermediate position between the internal combustion motor and the mechanical coupler.

According to further solutions, the mobile operating machine comprises a second electric motor connected to the electric accumulator and configured to drive the drum, and the articulated arm and the pumping unit are each associated with a corresponding hydraulic pump.

According to a variant embodiment, the articulated arm comprises a plurality of sections pivoted to each other and moved by a plurality of electric motors connected to the electric accumulator, and the pumping unit and the drum are each associated to a corresponding hydraulic pump.

According to further embodiments of the invention, the electric accumulator is provided with a connection device configured to connect the electric accumulator to a source of electric energy.

The mobile operating machine can also comprise an electronic converter connected to the electric accumulator.

According to a possible solution, the electric accumulator is configured to convert the alternating electric energy generated by the electromechanical machine into continuous energy to be accumulated by the electric accumulator, when the electromechanical machine is in its first operating condition, and to convert the continuous electric energy of the electric accumulator, into alternating electric energy to supply the electromechanical machine, when the latter is in its second operating condition.

A further purpose of the invention is a functioning method of a concrete mixer pump truck to transport, mix and pump concrete which comprises moving a motor vehicle by means of the movement unit connected to an internal combustion motor, pumping concrete to an articulated arm, delivering the concrete with the articulated arm.

The method provides to drive at least one of either the articulated arm or the pumping unit by driving a hydraulic pump able to provide a working fluid. An electromechanical machine is connected to the internal combustion motor, to the hydraulic pump and to an electric accumulator, and assumes at least a first operating condition in which it converts the mechanical energy of the internal combustion motor into electric energy to be accumulated in the electric accumulator, and a second operating condition in which it converts the electric energy of the electric accumulator into mechanical energy to drive the hydraulic pump.

Furthermore, during the braking of the vehicle, part of the power used to generate the deceleration can be recovered to recharge the accumulator.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF ILLUSTRATIVE EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
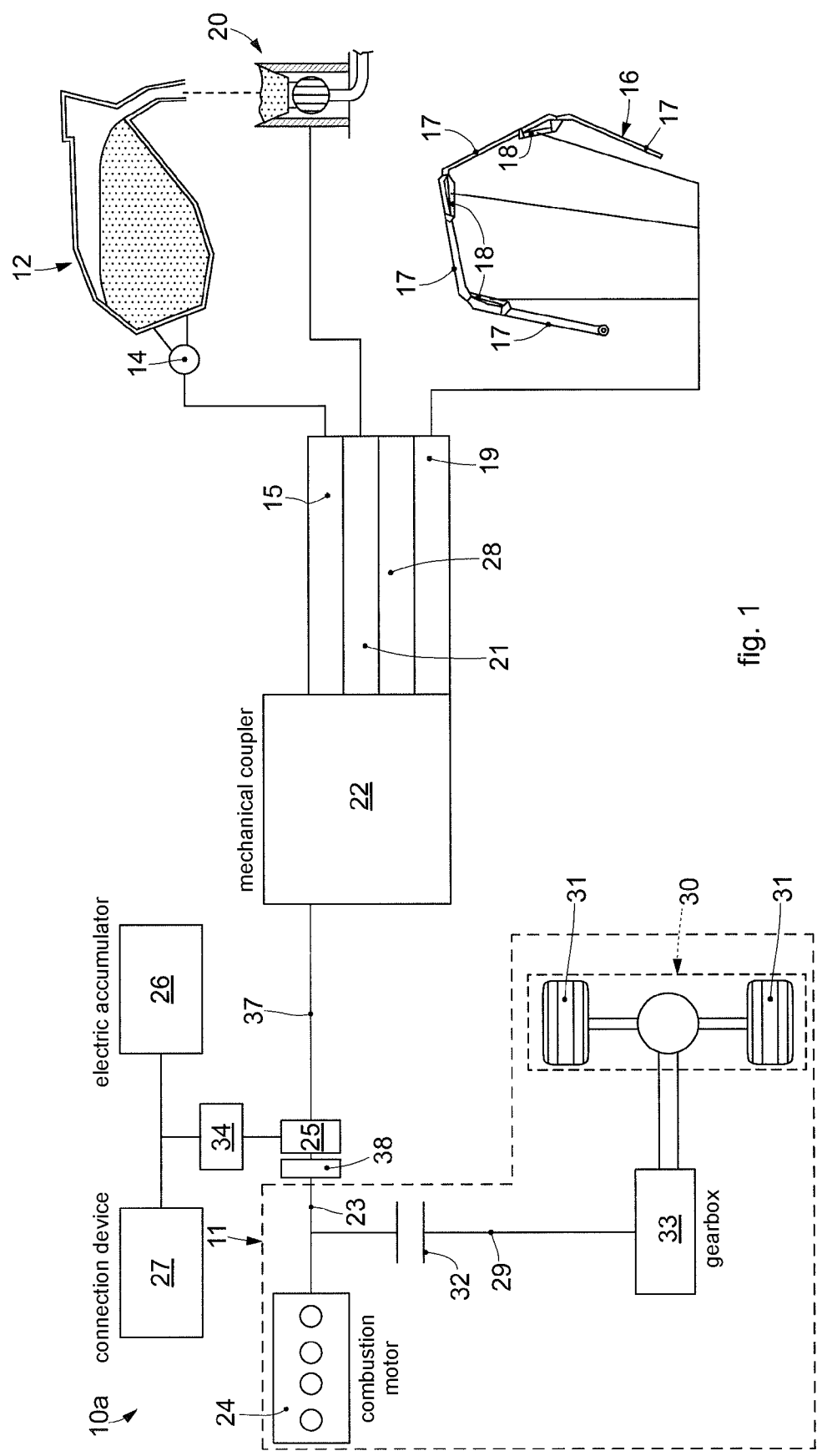
FIG. 1 is a schematic view of a mobile operating machine according to a first embodiment of the invention.

With reference to the attached drawings, in particular to FIG. 1 thereof, a mobile operating machine 10a according to the present invention, in this case a concrete mixer pump truck, schematically comprises a motor vehicle 11 on which a rotatable drum 12 is mounted.

The drum 12 comprises a hydraulic rotation motor 14, connected to a hydraulic pump 15, able to pressurize the oil-dynamic fluid that drives the hydraulic motor 14.

By means of the drum 12, in a known manner, the concrete is produced and mixed in one direction of rotation, while the concrete is discharged in the opposite direction of rotation.

The mobile operating machine 10a also comprises an articulated arm 16 to distribute the concrete, which is provided with a series of reciprocally articulated sections 17 which can be rotated with respect to each other by corresponding hydraulic actuators or hydraulic motors 18.

The hydraulic actuators 18 can be connected, for their movement, to corresponding hydraulic pumps or to a single hydraulic pump 19. The hydraulic pump 19 is able to pressurize the oil-dynamic fluid that drives the hydraulic actuators 18.

The mobile operating machine 10a also comprises a pumping unit 20, configured to pressurize and transfer the mixed concrete from the drum 12 toward the articulated arm 16 to distribute the concrete, for example by means of a suitable pipe that goes from a receptacle located downstream of the drum 12 and reaches the articulated arm 16, for example at its end.

The unit 20 that pumps the concrete from the drum 12 to the articulated arm 16, can also be provided, in order to be driven, with a hydraulic pump 21 suitable to pressurize the oil-dynamic fluid necessary for the operation of the articulated arm 16.

The hydraulic pumps 15, 19 and 21 respectively associated with the drum 12, the articulated arm 16 and the pumping unit 20, can be connected, in particular selectively, to a mechanical coupler 22, connected to a drive shaft 23 of an internal combustion motor 24. In particular, the mechanical coupler 22 is configured to connect the internal combustion motor 24 to the hydraulic pumps 15, 19 and 21.

An electromechanical machine 25 is connected to the drive shaft 23 of the internal combustion motor 24.

The electromechanical machine 25 can possibly be connected in axis with the drive shaft 23 of the internal combustion motor 24.

A disengagement device 38 is positioned between the electromechanical machine 25 and the internal combustion motor 24, able to allow the disconnection of the internal combustion motor 24 from the electromechanical machine 25, so that the present mobile operating machine 10a-10d can have a purely electric operating mode.

The disengagement device 38 can comprise an idle wheel or an overrunning joint.

In some embodiments, the mechanical coupler 22 comprises a drive shaft 37 connected to the electromechanical machine 25, and the hydraulic pumps 15, 19, 21 are all connected to the mechanical coupler 22.

The drive shaft 37 can be substantially aligned and in axis with the drive shaft 23 of the internal combustion motor 24.

The drive shaft 37 could also be offset and/or oriented differently with respect to the drive shaft 23.

Schematically, the electromechanical machine 25 is connected to an electronic converter 34 responsible for the control of the electromechanical machine 25, that is, the management of continuous and/or alternate electric energy. The electronic converter 34 is connected to the electric accumulator 26, for example to one or more batteries.

The electric accumulator 26 can be recharged by means of the electromechanical machine 25.

According to some embodiments of the invention, the electric accumulator 26 is provided with a connection device 27 configured to connect the electric accumulator 26 to a source of electric energy, for example a normal electricity network.

Another hydraulic pump can also be connected to the mechanical coupler 22, for example an auxiliary hydraulic pump 28, such as a hydraulic pump to drive a system to wash the various components of the mobile operating machine 10a or other.

The motor vehicle 11 comprises, as mentioned, the internal combustion motor 24, for example a diesel engine, the drive shaft 23 of which is configured to rotate a transmission shaft 29 of a movement unit 30, provided with wheels 31.

A clutch 32 and a gearbox 33, of any known type, can be associated with the drive shaft 23 to determine the drive of the movement unit 30.

In the configuration of FIG. 1, the mobile operating machine 10a can provide only the electromechanical machine 25, able to supply power to the mechanical coupler 22 and therefore, selectively, to the hydraulic pumps 15, 21, 28 and 19 keyed thereon.

The electromechanical machine 25 is positioned inside the kinematic chain in such a way that it can be moved both by the electric accumulator 26 and also by the internal combustion motor 24, therefore it can operate both as a real motor and also as a generator.

Substantially, therefore, a mobile operating machine 10a is made with the possibility of operating in a hybrid manner.

Figure 2:
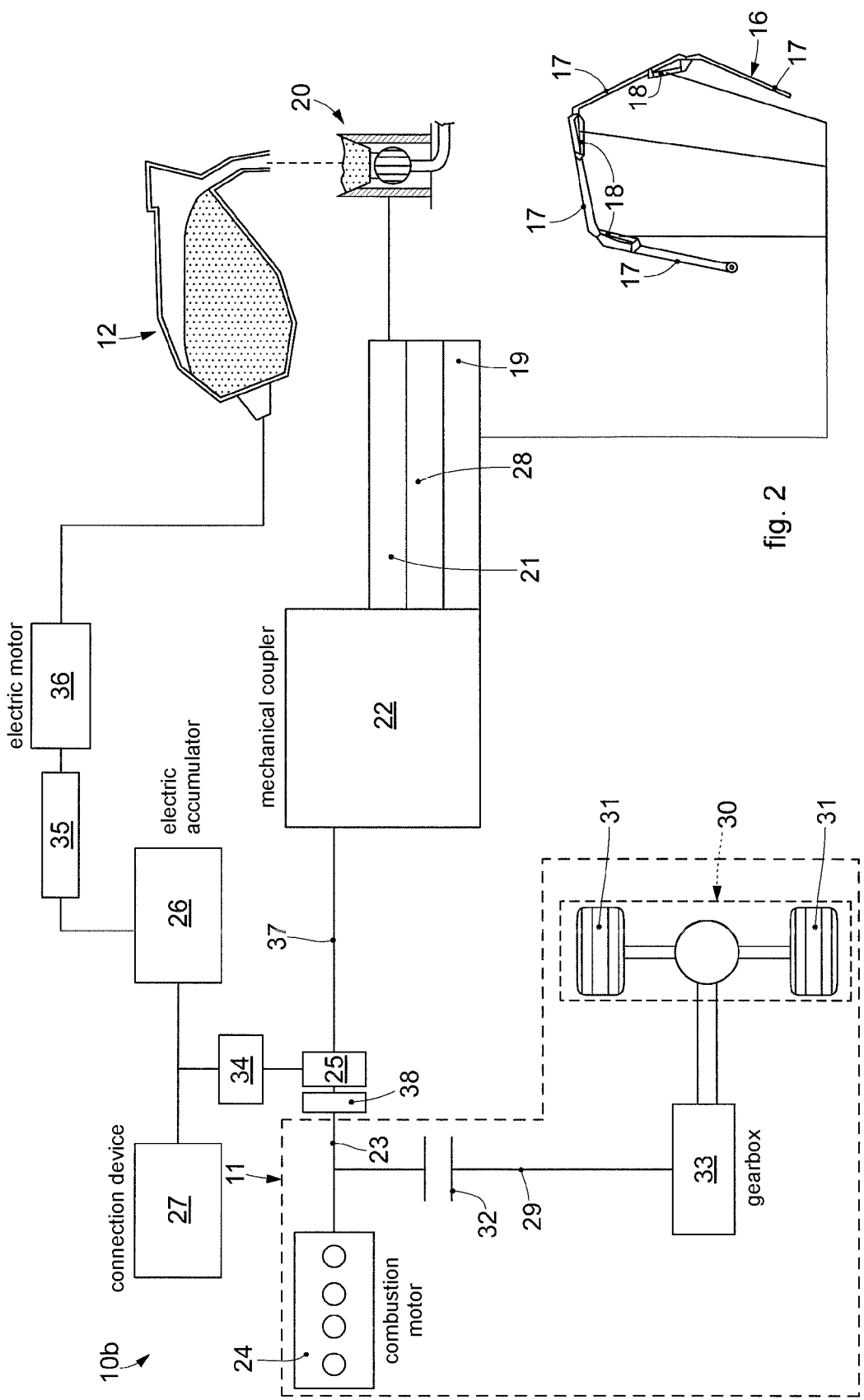
FIG. 2 is a schematic view of a mobile operating machine according to a second embodiment of the invention.

A further configuration of the mobile operating machine 10b is shown, for example, in FIG. 2. In this configuration, compared to the solution described with reference to FIG. 1, the hydraulic pump 15 and the hydraulic motor 14 are absent and the electric accumulator 26 feeds, via an electric energy converter 35, in this case an inverter, another electric motor 36, which drives the drum 12, that is, it rotates the drum 12 in one direction or in the other.

Figure 3:
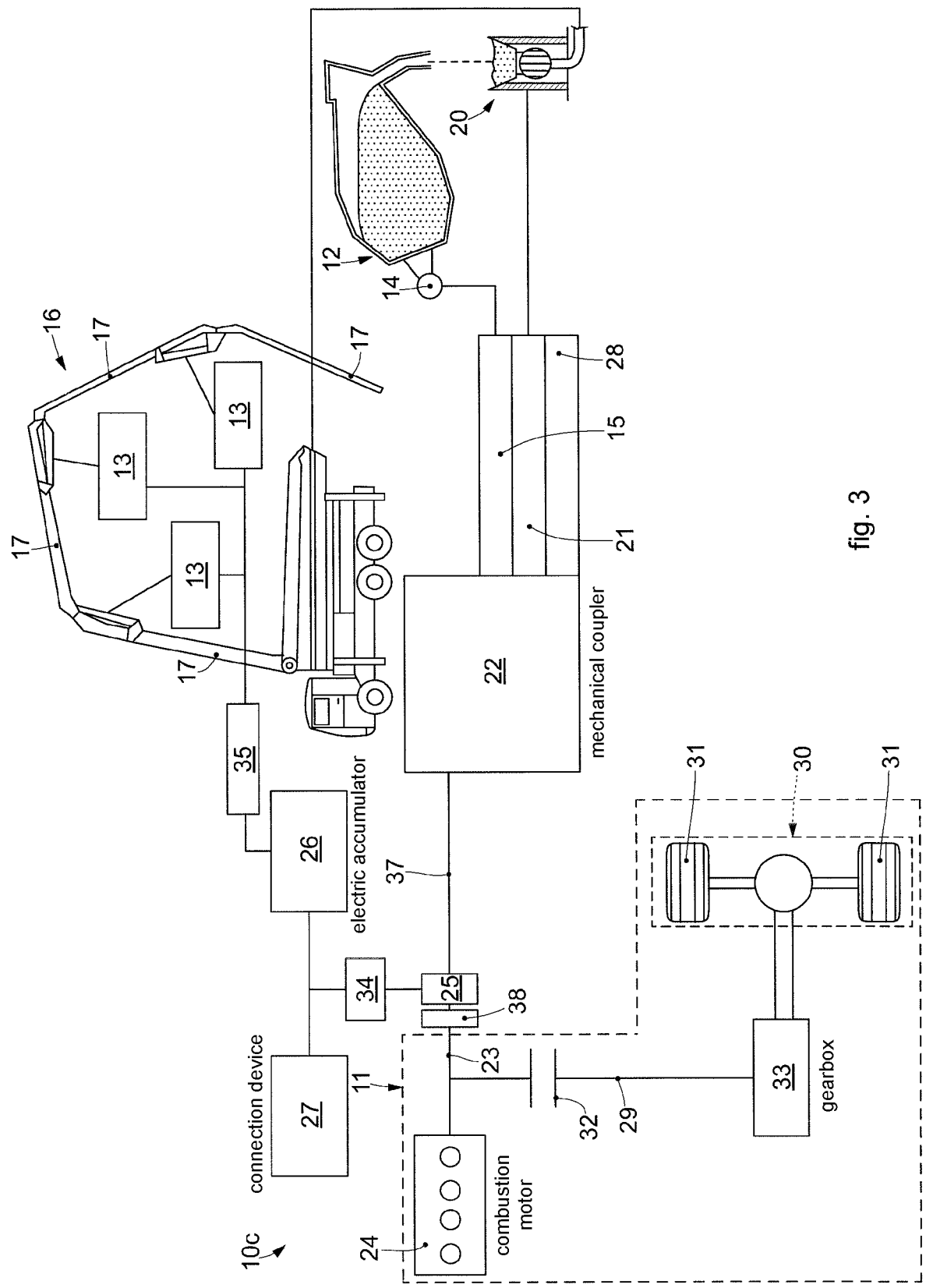
FIG. 3 is a schematic view of a mobile operating machine according to a third embodiment of the invention.

A further configuration of the mobile operating machine 10c is shown for example in FIG. 3. In this case, there is a series of electric motors 13 each associated with two adjacent sections 17 of the articulated arm 16. Therefore, in this case, compared to the solution described with reference to FIG. 1, the hydraulic pump 19 and the hydraulic actuators or motors 18 are absent.

The configurations of the mobile operating machines 10b and 10c described in FIG. 2 and FIG. 3 allow to reach operating efficiencies that are clearly higher than those achievable with known mobile operating machines which operate only by means of an internal combustion motor and oil-dynamic systems, since it is provided to use at least an electric-type drive, therefore for example the electric motor 36 for the mobile operating machine 10b and the electric motors 13 for the mobile operating machine 10c.

Figure 4:
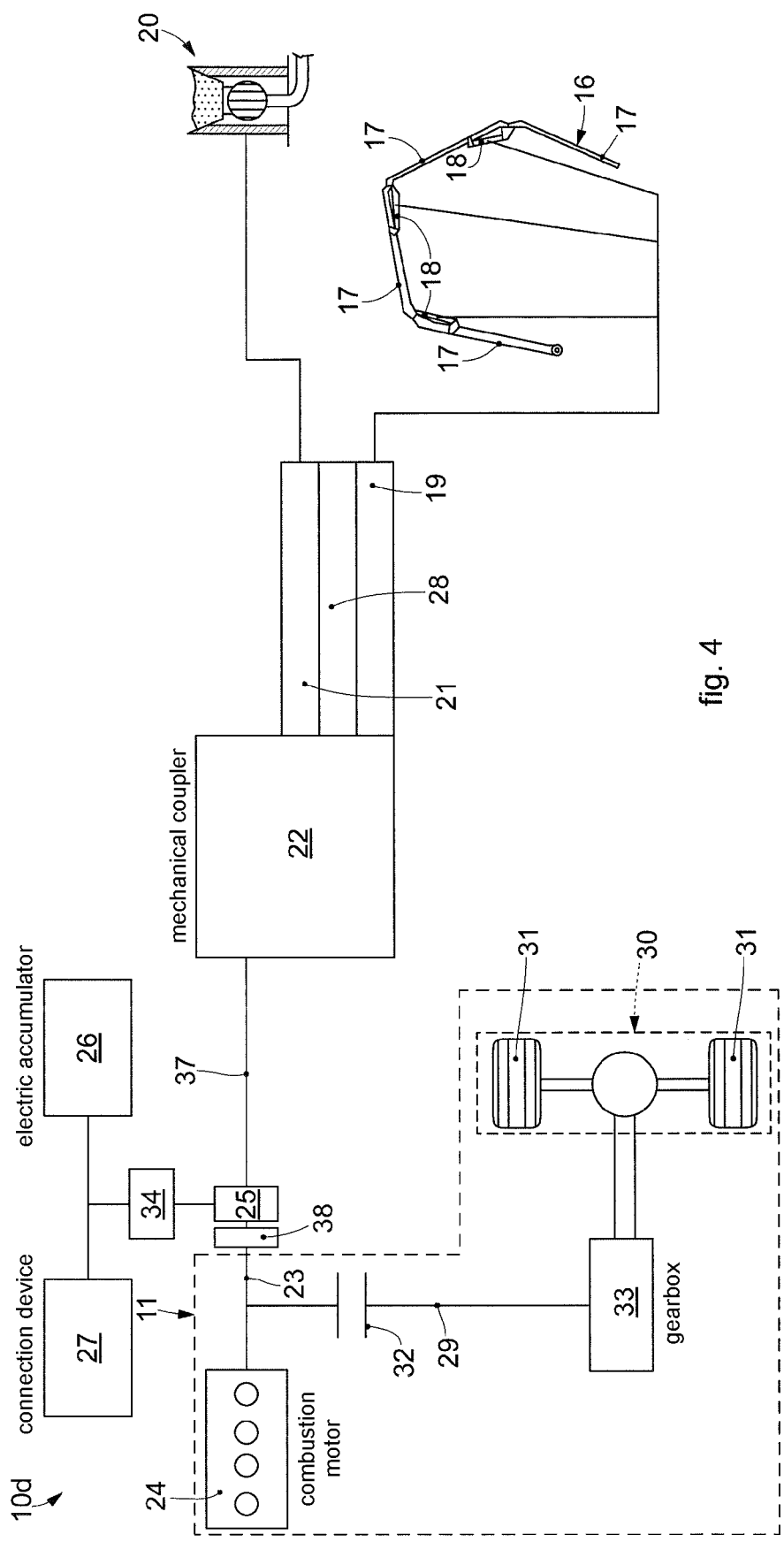
FIG. 4 is a schematic view of a mobile operating machine according to a fourth embodiment of the invention.

FIG. 4 shows a further variant of the present mobile operating machine 10d, which is substantially a truck-mounted pump, provided therefore with the articulated arm 16 and the pumping unit 20 able to transfer the concrete toward the articulated arm 16.

The concrete, in this case, will be discharged from one or more drums external to the mobile operating machine 10d, therefore for example concrete mixer trucks interacting with the mobile operating machine 10d in a known manner to supply it with concrete. The external drums provide to discharge the concrete into the pumping unit 20 of the mobile operating machine 10d to be subsequently transferred through the articulated arm 16.

Let us now consider some operating modes of the mobile operating machine according to the present invention, advantageously provided with great operating flexibility, for example with reference to the mobile operating machine 10a.

In the examples which follow in FIGS. 5 to 10, the operating modes will be schematically highlighted with the help of directional arrows, shown by dashes.

Figure 5:
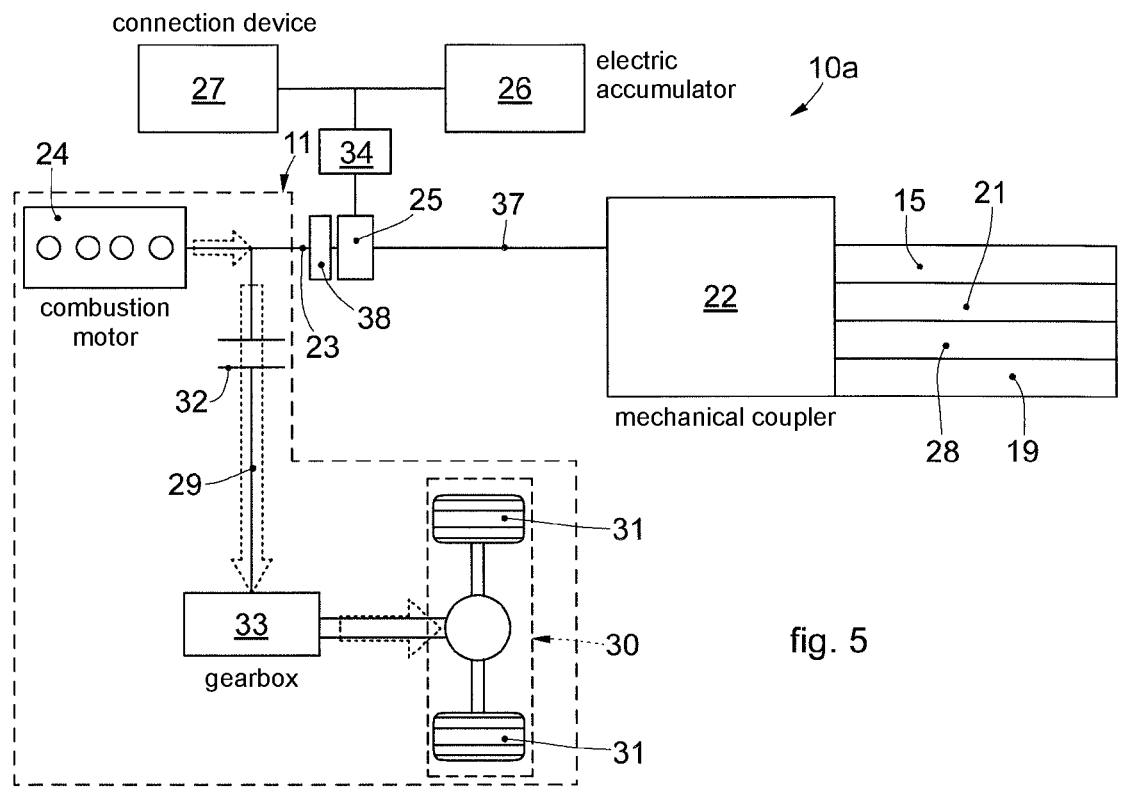
FIG. 5 is a schematic view of an operating mode of the present mobile operating machine during transport on the road.

In the case of FIG. 5, the operating mode of the mobile operating machine 10a can be that of transport on the road. In this case, the power from the internal combustion motor 24 of the motor vehicle 11 is used to move the equipment on the road.

Figure 6:
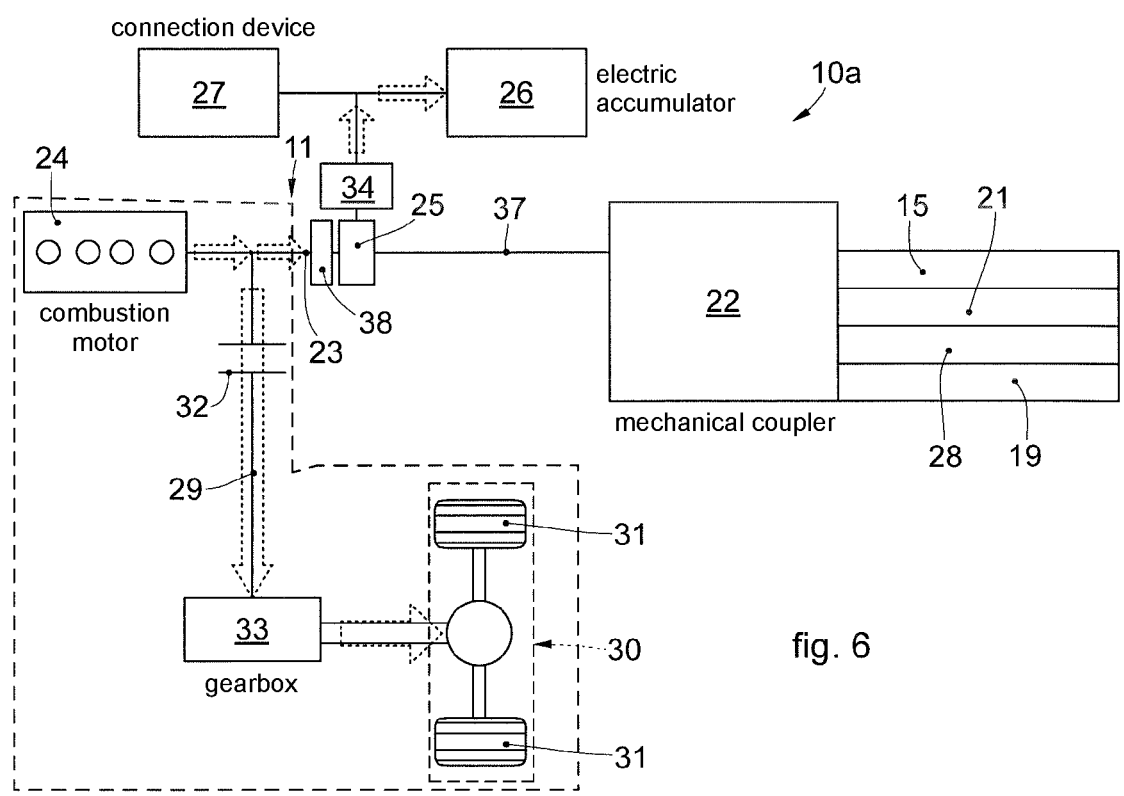
FIG. 6 is a schematic view of an operating mode of the present mobile operating machine during recharging on the road.

In the situation of FIG. 6, which can refer to an operating procedure of the mobile operating machine 10a with recharging on the road, part of the mechanical power coming from the internal combustion motor 24 and necessary to move the motor vehicle 11 is used to recharge the accumulator 26. In this step, therefore, the electromechanical machine 25 functions as an electric generator and supplies electric energy to the electric accumulator 26. It is advantageous to act in this way because it is possible to guarantee recharging by exploiting high energy yields and subtracting energy from the internal combustion motor 24 only in particular conditions, such as for example:

number of revolutions close to the maximum efficiency of the internal combustion motor 24;
 ideal torque (as per the rating plate) with which the electric generator, that is, the electromechanical machine 25, is driven.

Figure 7:
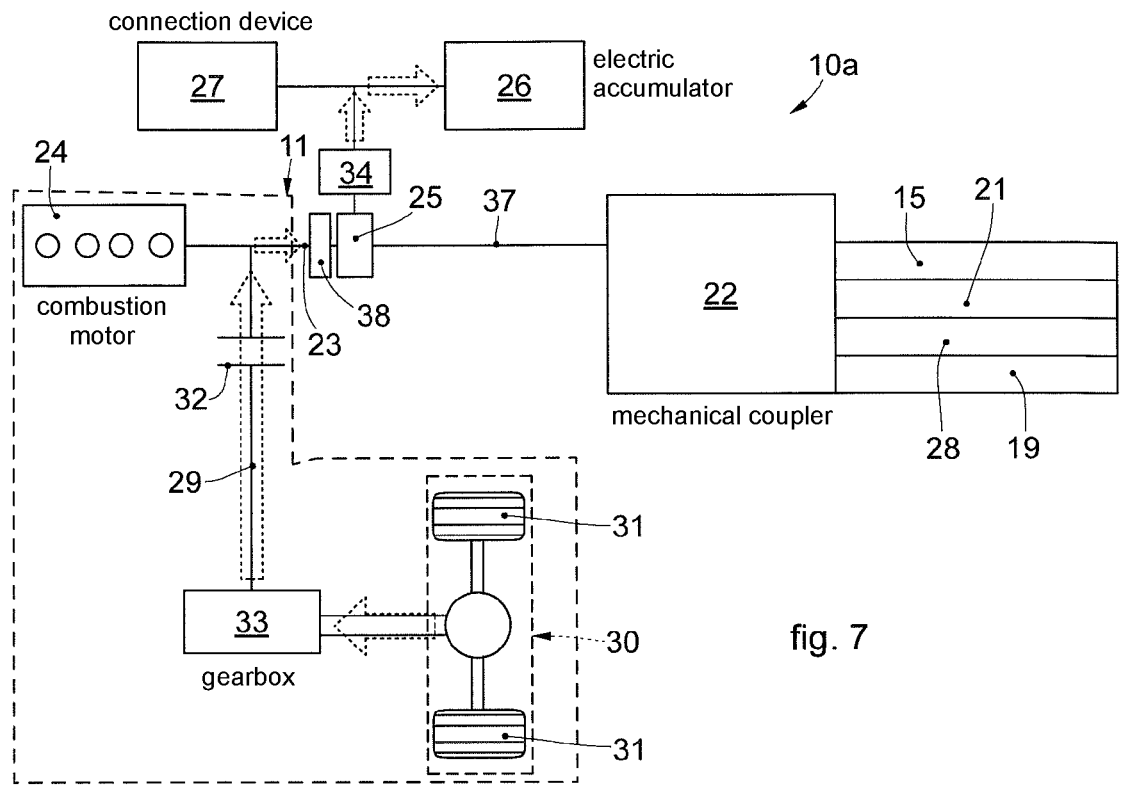
FIG. 7 is a schematic view of an operating mode of the present mobile operating machine during deceleration on the road.

In the operation of FIG. 7, it can be assumed that the operating situation of the mobile operating machine 10a concerns braking on the road. During the steps of braking on the road, part of the power used to generate the deceleration is recovered by means of the electromechanical machine 25. Substantially, therefore, during the braking step, part of the energy coming from the drive of the internal combustion motor 24 is used by the electromechanical machine 25 for the purpose of recharging the electric accumulator 26.

Figure 8:
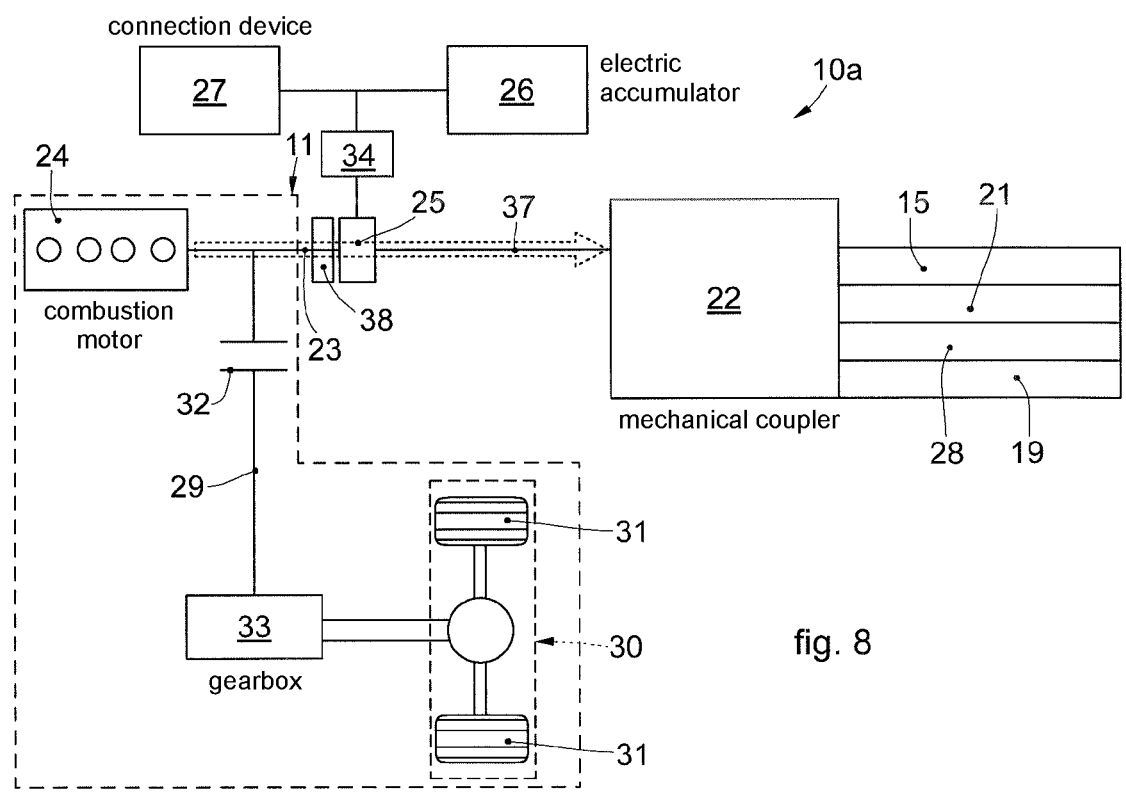
FIG. 8 is a schematic view of an operating mode by internal combustion motor of the present mobile operating machine.

FIG. 8 shows, for completeness, a direct operating mode by means of the internal combustion motor 24 of the mobile operating machine 10a which supplies the mechanical energy directly to the mechanical coupler 22 to drive the respective pumping devices connected thereto.

This mode may not assume the use of the electromechanical machine 25 to generate the power necessary to operate the equipment, for example the drum 12, the articulated arm 16 or the pumping unit 20.

Figure 9:
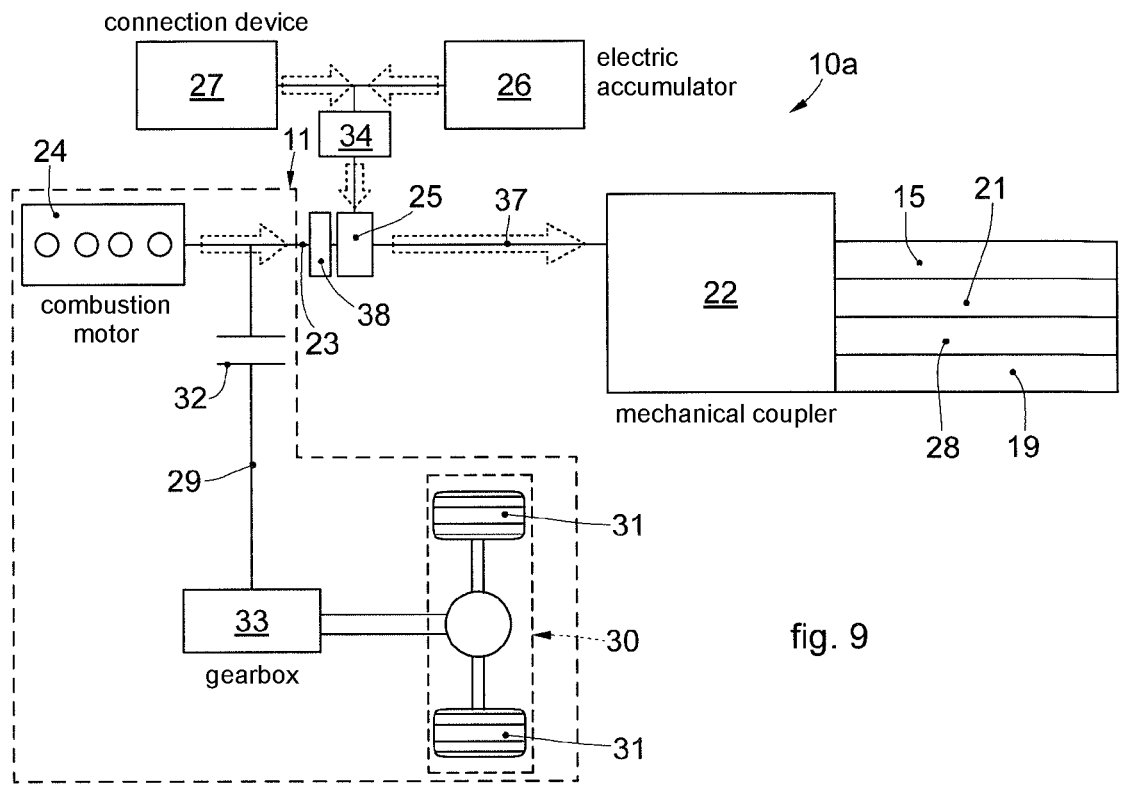
FIG. 9 is a schematic view of a hybrid operating mode of the present mobile operating machine.

FIG. 9 shows instead a hybrid operating configuration of the mobile operating machine 10a. During the hybrid operation step, part of the power to drive the mechanical coupler 22 is generated by the internal combustion motor 24 of the motor vehicle 11 and part of the power is taken from the accumulator 26 and therefore produced by the electromechanical machine 25.

A particular case of this type of operation shown in FIG. 9 is the contribution of further electric power that can be supplied to the electromechanical machine 25 and/or to the electric accumulator 26 also by means of connection of the connection device 27 to the external source of electric energy, both in direct current and also in alternating current.

Figure 10:
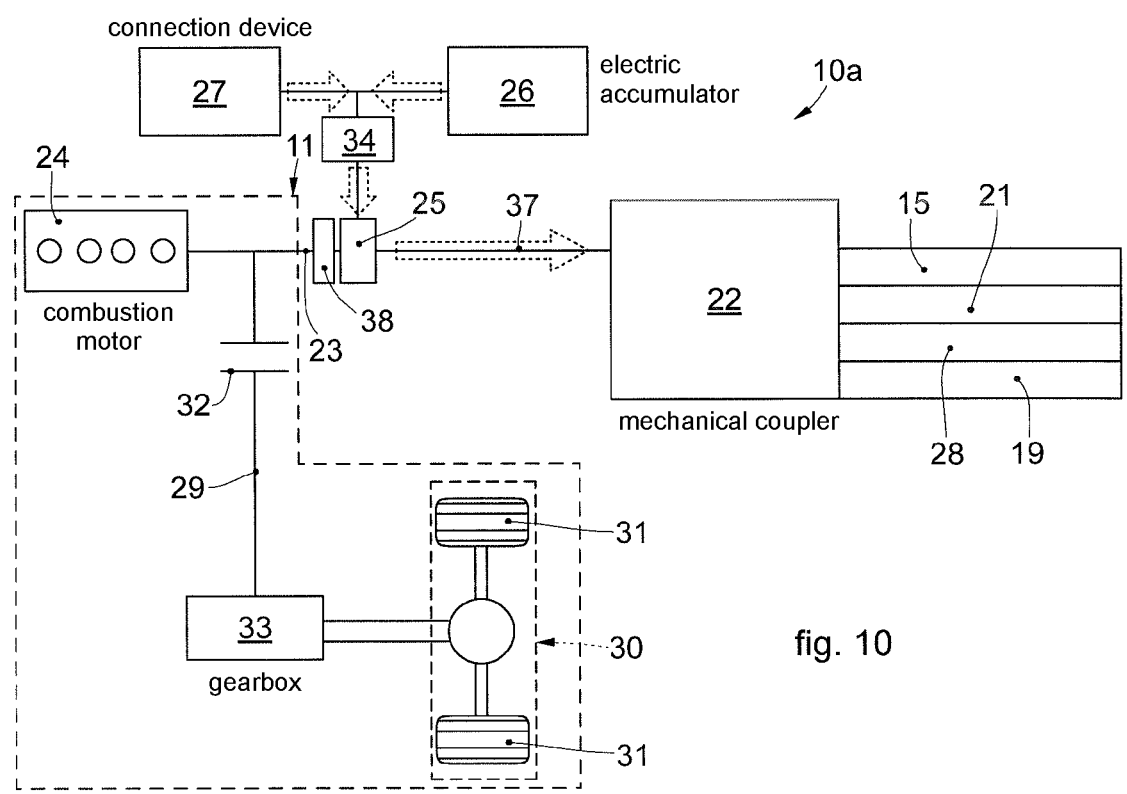
FIG. 10 is a schematic view of a purely electric operating mode of the present mobile operating machine.

FIG. 10, for completeness, shows the possibility of a purely electric operation of the present mobile operating machine 10a, that is, all the power can be taken from the accumulator 26 and transferred, thanks to the electromechanical machine 25, to the mechanical coupler 22 on which the hydraulic pumps 15, 21, 28 and 19 are mechanically mounted. Also in this particular case, it is possible to provide the supply of additional electric power to the electromechanical machine 25 by means of connection to the external source of electric energy.

The present mobile operating machine 10a, 10b or 10c therefore proves to be extremely flexible in its operating modes, for example according to the duration of the mission and to the type of work (and therefore concrete). The duration of the mission and the consistency of the concrete, for example, can determine the type of operation of the machine. The more the machine has to work with fluid concrete, for example, the longer the duration of the mission can be; on the other hand, the harder the concrete, the shorter the operation in electric mode will be.

It is clear that modifications and/or additions of parts may be made to the mobile operating machine as described heretofore, without departing from the field and scope of the present invention.

It is also clear that, although the present invention has been described with reference to some specific examples, a person of skill in the art shall certainly be able to achieve many other equivalent forms of mobile operating machine, having the characteristics as set forth in the claims and hence all coming within the field of protection defined thereby.

What is claimed:

1. A mobile operating machine, comprising a motor vehicle provided with at least one internal combustion motor which cooperates with a movement unit to move said motor vehicle, at least one articulated arm able to deliver concrete and at least one pumping unit configured to pump the concrete to said articulated arm, said mobile operating machine being wherein at least one of either the articulated arm or the pumping unit is connected to a respective hydraulic pump configured to pump a working fluid and determine the drive of said articulated arm and/or said pumping unit, comprising at least one electromechanical machine connected to an electric accumulator, to said respective hydraulic pump and to said internal combustion motor, wherein said electromechanical machine is configured to assume at least a first operating condition in which it converts the mechanical energy of said internal combustion motor into electric energy to be accumulated in said electric accumulator, and a second operating condition in which it converts the electric energy of said electric accumulator into mechanical energy to drive the hydraulic pump, and wherein the mobile operating machine further comprises a plurality of hydraulic pumps selectively connected to said electromechanical machine by means of a mechanical coupler.

2. The machine as in claim 1, comprising a rotatable drum to mix the concrete and at least one of either said drum, said articulated arm or said pumping unit is connected to a corresponding hydraulic pump, configured to pump a working fluid and determine the drive respectively of said drum, said articulated arm and/or said pumping unit.

3. The machine as in claim 2, wherein at least one of either the drum, the articulated arm or the pumping unit is driven by at least one electric motor, distinct from said electromechanical machine, and connected to said electric accumulator.

4. The machine as in claim 3, comprising a second electric motor connected to said electric accumulator and configured to drive said drum, and wherein said articulated arm and said pumping unit are each associated with a corresponding hydraulic pump.

5. The machine as in claim 2, wherein said articulated arm comprises a plurality of sections pivoted to each other, the plurality of sections being moved by a plurality of electric motors connected to said electric accumulator, and wherein said pumping unit and said drum are each associated to a corresponding hydraulic pump.

6. The machine as in claim 1, wherein at least one disengagement device is positioned between said internal combustion motor and said electromechanical machine, and is able to allow the selective disconnection of the internal combustion motor from said electromechanical machine.

7. The machine as in claim 6, wherein said disengagement device is an idle wheel or an overrunning joint.

8. The machine as in claim 1, wherein said mechanical coupler comprises a drive shaft connected to said electromechanical machine, and wherein said plurality of hydraulic pumps are all connected to said mechanical coupler.

9. The machine as in claim 1, wherein said electric accumulator is provided with a connection device configured to connect said electric accumulator to a source of electric energy.

10. The machine as in claim 1, further comprising an electronic converter connected to said electric accumulator.

* * * * *